(12) United States Patent
Hu et al.

(10) Patent No.: US 10,916,020 B2
(45) Date of Patent: Feb. 9, 2021

(54) METHOD AND DEVICE FOR IDENTIFYING LIGHT SOURCE

(71) Applicant: Guangdong Virtual Reality Technology Co., Ltd., Guangzhou (CN)

(72) Inventors: Yongtao Hu, Guangzhou (CN); Jingwen Dai, Guangzhou (CN); Jie He, Guangzhou (CN)

(73) Assignee: GUANGDONG VIRTUAL REALITY TECHNOLOGY CO., LTD., Guangzhou (CN)

( * ) Notice: Subject to any disclaimer, the term of this patent is extended or adjusted under 35 U.S.C. 154(b) by 113 days.

(21) Appl. No.: 16/313,056

(22) PCT Filed: Jun. 21, 2017

(86) PCT No.: PCT/CN2017/089296
§ 371 (c)(1),
(2) Date: Dec. 24, 2018

(87) PCT Pub. No.: WO2018/232613
PCT Pub. Date: Dec. 27, 2018

(65) Prior Publication Data
US 2019/0392590 A1 Dec. 26, 2019

(51) Int. Cl.
*G06T 7/246* (2017.01)
*G06F 16/23* (2019.01)
(Continued)

(52) U.S. Cl.
CPC .............. *G06T 7/248* (2017.01); *G01J 3/505* (2013.01); *G06F 16/215* (2019.01); *G06F 16/23* (2019.01);
(Continued)

(58) Field of Classification Search
CPC ....... G06T 7/248; G01J 3/505; G06K 9/4661; G06K 9/6215; G06F 16/215
See application file for complete search history.

(56) References Cited

U.S. PATENT DOCUMENTS

2016/0119756 A1* 4/2016 Ryan .................. H04B 10/1141
398/118

FOREIGN PATENT DOCUMENTS

CN 103383446 A 11/2013

OTHER PUBLICATIONS

International Search Report issued in corresponding International application No. 2017089296, dated Feb 28, 2018(9 pages).

* cited by examiner

*Primary Examiner* — Ruiping Li (57) ABSTRACT

The present disclosure provides a method and device for identifying a light source. The method includes as follows. M stripe sets in an image may be detected. A first energy spectrum data corresponding to each of M stripe sets may be obtained. A second energy spectrum data corresponding to each light source in a database may be obtained. The database may include K light sources, and the energy spectrum data corresponds to an identity of the light source. A correlation coefficient between the second energy spectrum data and the first energy spectrum data may be calculated to obtain M*K correlation coefficients. The identity of each stripe set corresponding to the light source in the database may be determined according to the M*K correlation coefficients. With this disclosure, the tracking of the light source emitted by a controller can be achieved.

20 Claims, 4 Drawing Sheets

(51) Int. Cl.
*G06F 16/215* (2019.01)
*G01J 3/50* (2006.01)
*G06K 9/46* (2006.01)
*G06K 9/66* (2006.01)
*G06F 3/03* (2006.01)

(52) U.S. Cl.
CPC ............ *G06K 9/4661* (2013.01); *G06K 9/66* (2013.01); *G06F 3/0304* (2013.01)

METHOD AND DEVICE FOR IDENTIFYING LIGHT SOURCE

This application claims priority to a PCT application No. PCT/CN2017/089296, titled "METHOD AND DEVICE FOR IDENTIFYING LIGHT SOURCE" and filed on Jun. 21, 2017. The entirety of the above-mentioned application is hereby incorporated by reference herein.

TECHNICAL FIELD

The present disclosure relates to image processing technical field, and more particularly, to a method and device for identifying light source.

BACKGROUND

With the development of technology of human-machine interaction, using moving object such as swinging gesture to input instructions, to replace means of direct contact with computer device, has become a trend.

A motion tracking system can capture images of light sources (such as LEDs) on moving objects by means of image processing, identify the moving objects according to the characteristics of the light sources, and then realize tracking of the moving objects. However, it is still a technical problem to identify moving object according to the characteristics of light source correspondingly.

SUMMARY

In order to identify a moving object according to the feature of the light source on the moving object, the embodiments of the present disclosure provide a method and a device for identifying a light source.

In a first aspect, the present disclosure provides a method for identifying light source. The method may include the following. M stripe sets in an image may be detected. Wherein the image may be obtained by capturing an image of the environmental background through a rolling shutter image sensor. The environmental background may include M movable light sources, wherein M is a positive integer. A first energy spectrum data corresponding to each of M stripe sets may be obtained. A second energy spectrum data corresponding to each light source in a database may be obtained. Wherein the database may include K light sources, and the second energy spectrum data corresponds to an identity of the light source. A correlation coefficient between each second energy spectrum data and each first energy spectrum data of each light source in the K light sources may be calculated, to obtain M*K correlation coefficients. The identity of each stripe set corresponding to the light source in the database may be determined according to the M*K correlation coefficients.

In a second aspect, the present disclosure provides a device for identifying a light source. The device may include a detection unit, a first obtaining unit, a second obtaining unit, a calculation unit, and an identification unit. Wherein the detection unit may be configured to detect M stripe sets in an image to be identified. The first obtaining unit may be configured to obtain a first energy spectrum data corresponding to each of M stripe sets. The second obtaining unit may be configured to obtain a second energy spectrum data corresponding to each light source in a database, wherein the database includes K light sources, and each second energy spectrum data corresponds an identity of each light source. The calculation unit may be configured to calculate a correlation coefficient between the second energy spectrum data of each of K light sources and the first energy spectrum data corresponding to each of M stripe sets, to obtain M*K correlation coefficients. The identification unit may be configured to determine the identity of each stripe set corresponding to the light source in the database according to the M*K correlation coefficients.

In a third aspect, the present disclosure provides a device. The device may include a processor, a memory, a communication interface and a bus. Wherein the processor, the memory and the communication interface may be connected and communicate with each other through the bus. The memory may store executable program code. The processor runs a program corresponding to the executable program code by reading the executable program code stored in the memory, to execute the method for identifying a light source. Wherein, the method is the method as described in the first aspect.

In a forth aspect, the present disclosure provides a medium. The medium may be configured to store an application, and the application may be configured to execute the method for identifying a light source provided in the first aspect.

In a fifth aspect, the present disclosure provides an application. The application is configured to execute the method for identifying a light source provided in the first aspect.

The embodiments of the present disclosure detect M stripe sets in an image to be identified, and obtain a first energy spectrum data corresponding to each of M stripe sets and a second energy spectrum data corresponding to each light source in a database. The database includes K light sources, each second energy spectrum data corresponds to one light source's identity information, and different light sources have different frequency domain data. So, by calculating the correlation coefficient between each second energy spectrum data and each first energy spectrum data of each light source in the K light sources, the identity information of each stripe set corresponding to the light source in the database may be determined. So that, the tracking of the light source emitted by a controller can be achieved.

BRIEF DESCRIPTION OF THE DRAWINGS

In order to more clearly illustrate the embodiments of the present disclosure, the drawings used in the embodiments will be briefly described below. Obviously, the drawings in the following description are only some embodiments of the present disclosure, and those skilled in the art can obtain other drawings according to the drawings without any creative work.

DETAILED DESCRIPTION

The technical solutions in the embodiments of the present disclosure will be clearly and completely described in the following with reference to the accompanying drawings. It is apparent that the described embodiments are only a part of the embodiments of the disclosure, and not all of them. All other embodiments obtained by those skilled in the art based on the embodiments of the present invention without creative efforts are within the scope of the present invention.

Figure 1:
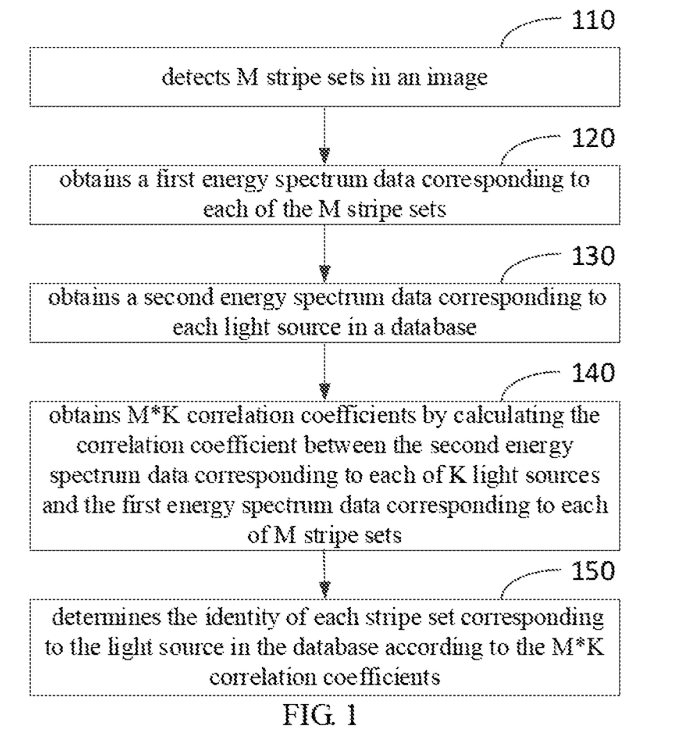
FIG. 1 illustrates a flow chart showing a method for identifying light source according to embodiments of the disclosure.

FIG. 1 is a flow chart schematically illustrating a method for identifying a light source according to an embodiment of the present disclosure. As illustrated in FIG. 1, the method for identifying a light source includes the flowing blocks.

At block 110, a processor detects M stripe sets in an image.

The image may be obtained by a rolling shutter image sensor configured to capture an image of an environmental background. The environmental background may include M light sources, and the light sources may be movable, wherein M is a positive integer.

The rolling shutter image sensor may be an image sensor with a rolling shutter, such as, a Complementary Metal Oxide Semiconductor (CMOS) sensor includes an electronic rolling shutter, a Charge Coupling Element (CCD) sensor includes a rolling shutter, or the like.

In an example embodiment, the movable light source may be a controller. The controller may be a game controller, a pointer, a somatosensory mouse, or the like, with one or more light sources. The number of the controllers can be one or more. The number of light sources on each controller can also be one or more. The light source may have a relatively stable flashing frequency or a changing flashing frequency, for example, an LED or the like. By controlling the duty cycle of the power input to the LED, it is possible to control the LED flashing at a fixed frequency or a non-fixed frequency, wherein the frequency of the light source is greater than the scanning frequency of the rolling shutter image sensor.

Figure 2:
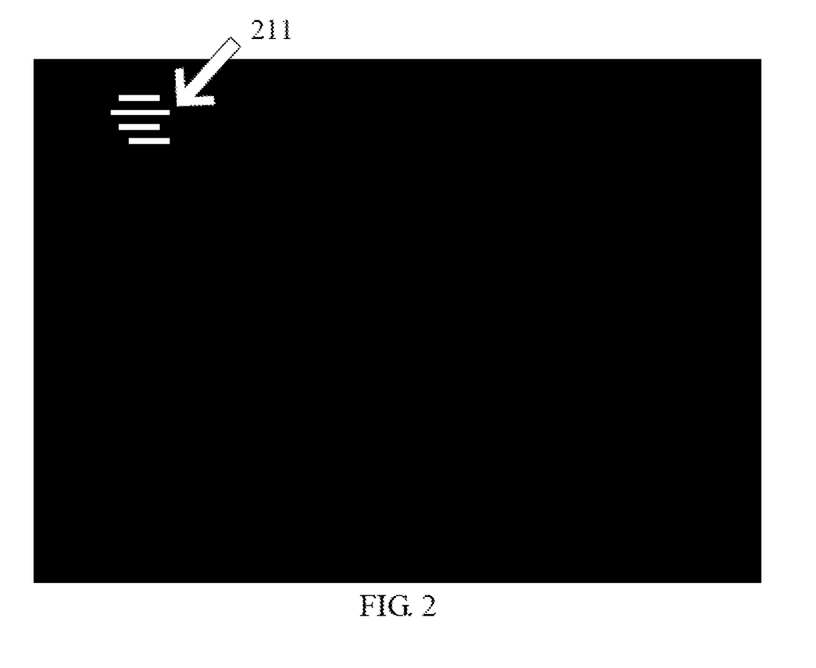
FIG. 2 illustrates a schematic view of a light source set in a method for identifying light source according to embodiments of the present disclosure.

The light source can be captured by the rolling shutter image sensor, and a pattern of alternating dark/white stripes can be formed in the horizontal direction of the image. As shown in FIG. 2, a stripe set 211 with alternating dark/white stripes may appear in the image after scanning the light source by the rolling shutter image sensor. Specifically, if the light source is "on", when the rolling shutter image sensor scans the light source, a white stripe corresponding to the light source may appear in the image. If the light source is "off", when the rolling shutter image sensor scans the light source, a dark stripe corresponding to the light source may appear in the image. In general, the stripe set in the image may include a pattern of alternating dark/white stripes formed by exposing the light source.

For easy discussion and illustration, the white stripes will be used to as an example in the following description. The shape of the outline of the stripe set in the image is related to the shape of the light source. For example, if the shape of the light source is circular, the stripe set may include a plurality of white stripes with different lengths, and the outline of the stripe set is circular. If the shape of the light source is rectangular, the stripe set may include some white stripes with same length, and the outline of the stripe set is rectangular. The width of the white stripes in the stripe set are related to the flashing period of the light source, for example, the longer flashing period of the light source may produce the wider width of the white stripes. Under extreme conditions, if the flashing period of the light source is infinite, the light source will form an all-bright spot on the image without stripes.

In some embodiments, each stripe set has a different feature width, the feature width can be a width of the dark stripe, or a width of the white stripe. The feature can be a ratio of the width between the white stripe and the dark stripe, and the ratio depends on a duty cycle of the light source. The number of stripe sets and the size of the area enclosed by the stripe sets vary with the distance among the light sources, when the state of the light source is changed, and the feature width between the white strips can be constant. In addition, the width of the white stripes can also be constant under certain conditions of resolution of a photoreceptor.

In some embodiments, the movable light source in the environmental background is identified by the rolling shutter image sensor in a stationary or moving state, different from the identified of stationary objects. It has a good tracking effect in tracking and identifying moving targets with light source. With the easy adhesion and portability of the light source, the application scene and application mode of identifying the target object are expanded, which has great application value in industry and life.

At block 120, a processor obtains a first energy spectrum data corresponding to each of the M stripe sets.

In some embodiments, the block 120 may include the followings. The processor can obtain each stripe set in the image. For each stripe set, taking a center ($u_0$, $v_0$) of the stripe set as a reference point, and the processor can obtain n sampling points by sampling along a first direction. The processor can obtain N calculation points by extending the n sampling points periodically. The processor can obtain Frequency domain data by transforming the N calculation points to frequency domain. And the processor can obtain the first energy spectrum data by normalizing energy spectrum data of the frequency domain data. Wherein, n is a positive integer greater than zero, N is a positive integer greater than 1, N is greater than n, N is equal to n times (k−1) plus m, m is less than or equal to n, and $$m = N - \text{int}\left(\frac{N}{n}\right) * n.$$

In an example embodiment, a coordinate system can be established, the center of the coordinate system can be the upper left corner of the image, the positive direction of the x-axis can be the rightward direction of the image, and the positive direction of the y-axis can be the downward direction of the image. In some embodiments, the center of the coordinate system may be established at other points of the image according to actual needs. The first direction may be a direction perpendicular to an extending direction of stripes in the stripe set. In this embodiment, the first direction is the positive direction of the y-axis. The center ($u_0$, $v_0$) of each stripe set can be calculated after establishing the coordinate system. Taking the center of the stripe set as a reference point, n sampling point $(d_1, d_2, \ldots, d_n)$ can be obtained by sampling along the first direction. Wherein, the center of the stripe set may be a gray-scale center of the stripe set, a geometric center of the stripe set, or an energy center of the stripe set; $u_0$ is a coordinate value of the center on the x-axis, and $v_0$ is a coordinate value of the center on the y-axis.

In some embodiments, the center of the stripe set is a gray-scale center, the method for calculating the center of the stripe set may be specifically as follows. The processor can obtain the gray-scale value of each pixel in the image, and calculate the gray-scale center of the stripe set according to formula (1).

$$\begin{cases} u_0 = \dfrac{\left(\sum_{i=1}^{k} u_i \times \text{gray}(u_i, v_i)\right)}{\sum_{i=1}^{k} \text{gray}(u_i, v_i)} \\ v_0 = \dfrac{\left(\sum_{i=1}^{k} v_i \times \text{gray}(u_i, v_i)\right)}{\sum_{i=1}^{k} \text{gray}(u_i, v_i)} \end{cases} \quad \text{formula (1)}$$

Wherein, i is a serial number of the stripe set pixels, k is a total number of pixels in the image, and i<k, $u_i$ is a coordinate value of the pixel i on the x-axis, $v_i$ is a coordinate value of the pixel i on the y-axis, and gray $(u_i, v_i)$ is the gray-scale value of the pixel i.

In some embodiments, taking the center $(u_0, v_0)$ of the stripe set as a reference point, sampling along the first direction to obtain n sampling point $(d_1, d_2, \ldots, d_n)$ may be as follows. When the first direction is a direction perpendicular to the width of the image, wherein the width direction of the image is the y-axis direction and the center of the stripe set is taken as the reference point of the first direction, the processor can obtain n sampling points $$\left\{d_1 = \left(u_0 - \frac{n}{2}, v_0\right), d_2 = \left(u_0 - \frac{n-1}{2}, v_0\right), \ldots, d_n = \left(u_0 + \frac{n-1}{2}, v_0\right)\right\}$$

by sampling along the first direction.

In some embodiments, taking the center of the stripe set as a reference point, sampling along the first direction to obtain n sampling point may be as follows. When the first direction is a direction parallel to the width of the image, wherein the width direction of the image is the y-axis direction, the processor can obtain n sampling points by sampling along the first direction, and take the center as the reference point of the first direction.

Figure 3:
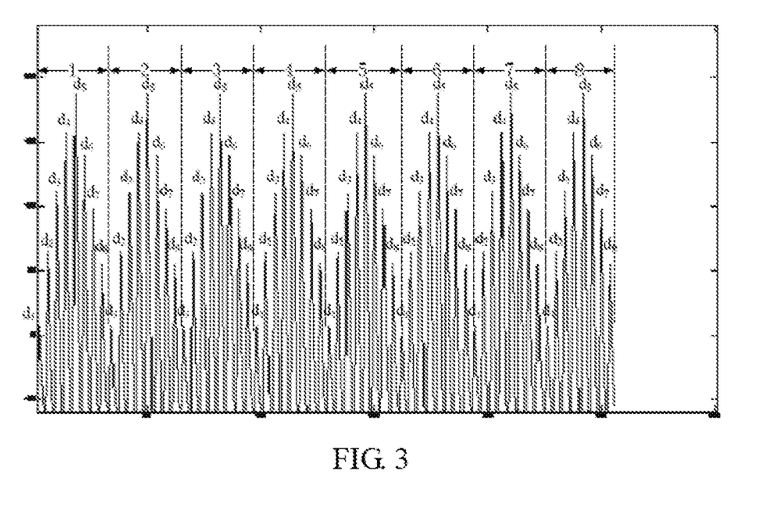
FIG. 3 is a waveform view after a sampling point period extension in a method for identifying light source according to embodiments of the present disclosure.

In some embodiments, n sampling points can be extended periodically, and the period may be k cycles, thus N calculation points $$\underbrace{[(d_1, d_2, \ldots, d_n), (d_1, d_2, \ldots, d_n), \ldots (d_1, d_2, \ldots, d_m)]}_{k \text{ cycles}}$$

may be obtained. As shown in FIG. 3, 8 protuberant waveforms are illustrated, each waveform includes 8 peaks, each peak corresponds to one sampling point in points $(d_1, d_2, \ldots, d_8)$, 256 calculation points can be obtained when extending sampling points with 8 cycles.

In an actual scene, the number of the sampling points may be the same or different when different stripe sets are sampled, and it is not limited in the present disclosure.

Figure 4:
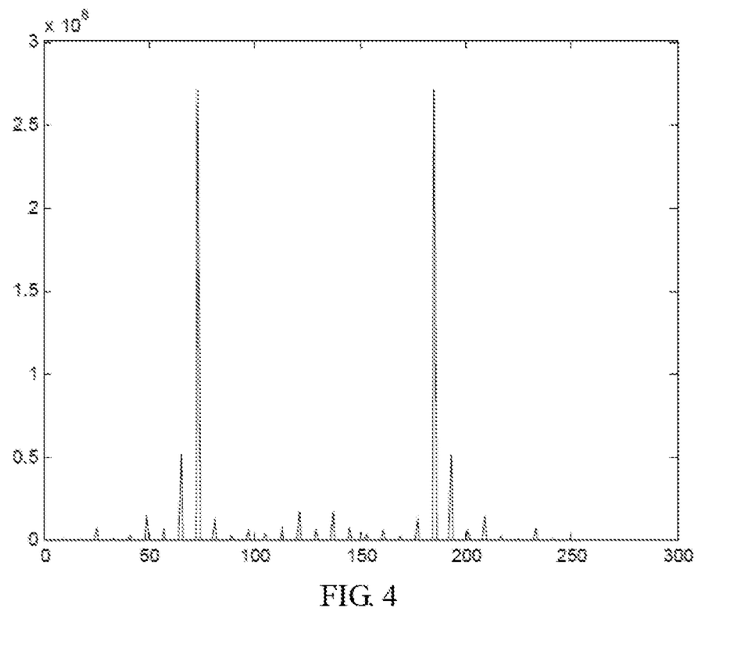
FIG. 4 is a waveform view by transforming the waveform of FIG. 3 to frequency domain according to embodiments of the present disclosure.

In some embodiments, transforming to the frequency domain may use a Fourier transform, a Laplace transform, a Z transform, or the like. The frequency domain data may be a combination of any one or more of amplitude data, energy data, and phase data. For example, the processor can obtain the waveform of the frequency domain data shown in FIG. 4 by performing Fourier transform on 256 calculation points shown in FIG. 3.

In some embodiments, the accuracy of the data may be improved by normalizing the frequency domain data. Wherein, the processor can obtain the first energy spectrum data $\overline{E_{fft}}$ by normalizing the energy spectrum data of the frequency domain data $E_{fft}$ by the calculation formula as shown in formula (2).

$$\overline{E_{fft}} = \frac{E_{fft}}{\sum E_{fft}} \quad \text{formula (2)}$$

At block 130, a processor obtains a second energy spectrum data corresponding to each light source in a database. The database may include K light sources, and each second energy spectrum data corresponds to the identity of each light source. The M light sources in the environmental background may be the light sources stored in the database. That is, the identity information of M light sources may be stored in the database, the processor can identify the identity of the light source corresponding to the stripe set in the image according to the light sources in the database.

In some embodiments, the second energy spectrum data is a normalized energy spectrum data, and the normalization method can be referred to in formula (2).

The second energy spectrum data may be the normalized energy spectrum data stored in the database according to each light source. The processor may also obtain the second energy spectrum data by normalizing the energy spectrum data in the frequency domain data calculated according to the frequency domain characteristics of each light source stored in the database.

At block 140, a processor obtains M*K correlation coefficients by calculating the correlation coefficient between the second energy spectrum data corresponding to each of K light sources and the first energy spectrum data corresponding to each of M stripe sets.

In some embodiments, the correlation coefficient between the second energy spectrum data and the first energy spectrum data may be a Pearson correlation coefficient, and the formula to calculate the Pearson correlation coefficient may be as follows.

$$\left\{\rho_{xy} = \frac{N\sum XY - \sum X \sum Y}{\sqrt{N\sum X^2 - (\sum X)^2} * \sqrt{N\sum Y^2 - (\sum Y)^2}}\right\} \quad \text{formula (3)}$$

Wherein, X is the second energy spectrum data corresponding to a light source in the database, Y is the first energy spectrum data corresponding to a stripe set in M stripe sets, and N is the dimension of energy spectrum data. In some embodiments, X and Y can be exchanged.

The Pearson correlation coefficient may be configured to measure whether two data sets are in a line and to measure the linear relationship between two interval variables. Therefore, the processor can obtain the identity information of each light source in the database corresponding to each of M stripe sets according to the Pearson correlation coefficient.

At block 150, a processor determines the identity of each stripe set corresponding to the light source in the database according to the M*K correlation coefficients.

Each second energy spectrum data in the database corresponds to the identity of a light source, that is, the processor can determine the second energy spectrum data corresponding to the M stripe sets according to the M*K correlation coefficients, thus the processor can determine the identity corresponding to the M stripe sets according to the determined second energy spectrum data, and the processor can determine the identity of the light source corresponding to each of the M stripe sets.

In some embodiments, the processor can determine the identity of each stripe set corresponding to the light source in the database as follows. The processor can obtain K maximum correlation coefficients by selecting from the correlation coefficients between the second energy spectrum data of each light source in the database and the first energy spectrum data of M stripe sets. That is, there are M correlation coefficients between one second energy spectrum data and M first energy spectrum data, a maximum correlation coefficient can be selected from the M correlation coefficients, thus the K maximum correlation coefficients can be obtained corresponding to K light sources. The processor can obtain L maximums correlation coefficients by selecting maximum correlation coefficients which are greater than a first threshold from the K maximum correlation coefficients. The processor can obtain P maximum correlation coefficients by performing deduplication on the L maximum correlation coefficients. The processor can obtain the identity information of the stripe set by determining the stripe set corresponding to the light source with the identity information in the database according to the P maximum correlation coefficient, and the processor can obtain the identity of the light source corresponding to stripe set in the M stripe sets.

Wherein, the first threshold is a preset constant, L is an integer less than or equal to K, P is an integer less than or equal to L, and P is less than or equal to M. When the maximum correlation coefficient is less than the first threshold, it is confirmed that the light source in the database corresponding to the maximum correlation coefficient is not the light source corresponding to the stripe set with the maximum correlation coefficient. When the maximum correlation coefficients of multiple light sources in the database corresponds to the same stripe set, it is confirmed that the light sources in the database corresponding to the multiple maximum correlation coefficients are not the light sources corresponding to the stripe sets. That is, the L maximum correlation coefficients are greater than the first threshold, and each of the P maximum correlation coefficients corresponds to a light source in the database and a set in the image uniquely.

For example, the first threshold is 0.6, the database contains five light sources, and the image contains three detected stripe sets. The processor can obtain the first energy spectrum data corresponding to each stripe set, respectively. The processor can obtain the second energy spectrum data corresponding to each light source in the database, and the processor can calculate the correlation coefficient between the second energy spectrum data of each light source and the first energy spectrum data of each stripe set. As shown in Table 1, the maximum correlation coefficients corresponding to the light source 11, the light source 22, the light source 33, the light source 44, and the light source 55 in the database and the stripe set 1, stripe set 2, and stripe set 3 in the image are 0.7, 0.4, 0.8, 0.9 and 0.9 respectively. Wherein, the maximum correlation coefficient corresponding to the light source 11 in the database and the stripe set 1, stripe set 2, and stripe set 3 in the image is 0.7. The maximum correlation coefficient corresponding to the light source 22 in the database and the stripe set 1, stripe set 2, and stripe set 3 in the image is 0.4. The maximum correlation coefficient corresponding to the light source 33 in the database and the stripe set 1, stripe set 2, and stripe set 3 in the image is 0.8. The maximum correlation coefficient corresponding to the light source 44 in the database and the stripe set 1, stripe set 2, and stripe set 3 in the image is 0.9. The maximum correlation coefficient corresponding to the light source 55 in the database and the stripe set 1, stripe set 2, and stripe set 3 in the image is 0.9. Since the maximum correlation coefficient 0.4 is less than the first threshold 0.6, the light source 22 does not correspond to any one of stripe set 1, stripe set 2, and stripe set 3. That is, the stripe set having the identity information of the light source 22 does not appear in the current data, the light source 22 is excluded. For the light source 11, the light source 33, the light source 44, and the light source 55, since the maximum correlation coefficient corresponding to the light source 33 and the maximum correlation coefficient corresponding to the light source 44 correspond to the stripe set 1, that is, the stripe set 1 has both identities of the light source 33 and the light source 44, which is obviously not possible. That is, the stripe set having the identity of the light source 33 and the stripe set having the light source 44 do not appear in the current data, so the light source 33 and the light source 44 are excluded. For the light source 11 and the light source 55, the maximum correlation coefficient of the light source 11 corresponds to the stripe set 3, and the maximum correlation coefficient of the light source 55 corresponds to the stripe set 2. That is, the identity of the light source corresponding to the stripe set 2 is the light source 55, and the identity of the light source corresponding to the stripe set 3 is the light source 11.

TABLE 1

|  | stripe set1 | stripe set2 | stripe set3 |
|---|---|---|---|
| light source 11 | 0.2 | 0.3 | 0.7 |
| light source 22 | 0.4 | 0.3 | 0.2 |
| light source 33 | 0.8 | 0.6 | 0.1 |
| light source 44 | 0.9 | 0.5 | 0.3 |
| light source 55 | 0.3 | 0.9 | 0.2 |

In some embodiments, the following block may be further included. After determining the identity of the stripe set corresponding to the light source, the processor can update the second energy spectrum data of the light source in the database corresponding to the stripe set according to the M*K correlation coefficients. In an example embodiment, the processor can obtain Q maximum correlation coefficients by selecting the maximum correlation coefficients, which are greater than a second threshold, corresponding to the determined stripe sets. That is, the number of the maximum correlation coefficients greater than the second threshold corresponding to the determined stripe sets is Q. The processor can update the second energy spectrum data of the light sources corresponding to the Q maximum correlation coefficients in the database.

Wherein, the second threshold is a preset constant, and Q is a positive integer less than or equal to P. When the maximum correlation coefficient is greater than the second threshold, the second energy spectrum data of the light source corresponding to the maximum correlation coefficient may be updated. That is, all of the Q maximum correlation coefficients are greater than the second threshold, the processor can update the second energy spectrum data of the light source corresponding to each of the Q maximum correlation coefficients in the database respectively.

For example, the first threshold is 0.6, the second threshold is 0.8, and the image contains three detected stripe sets. The processor can obtain the first energy spectrum data corresponding to each stripe set. The processor can obtain the second energy spectrum data corresponding to each light source in the database. The processor can obtain the correlation coefficient between the second energy spectrum data of each light source and the first energy spectrum data of each stripe set by calculating. As shown in Table 1, it can be obtained that the identity of the light source corresponding to the stripe set 2 is the light source 55, and the identity of the light source corresponding to the stripe set 3 is the light source 11. Since the correlation coefficient corresponding to the light source 55 and the stripe set 2 is 0.9 greater than the second threshold 0.8, the correlation coefficient corresponding to the light source 11 and the stripe set 3 is 0.7 less than the second threshold 0.8, so the second energy spectrum data corresponding to the light source 55 in the database can be updated to the first energy spectrum data corresponding to stripe set 2.

In some embodiments, the processor can update the second energy spectrum data of the light sources corresponding to the Q maximum correlation coefficients in the database as follows. The processor can obtain a third energy spectrum data corresponding to each of Q stripe sets, in each of previous E frames of the current image. The processor can calculate the offset of each of the Q stripe sets according to the third energy spectrum data. The processor can update the second energy spectrum data corresponding to the Q light sources in the database according to the Q offsets.

Wherein, E is a positive integer. That is, the efficiency may be improved by processing E frames simultaneously. In some embodiments, the calculation of the third energy spectrum data may refer to the calculation of the first energy spectrum data at block 110, and details are not described herein again. In some embodiments, the processor can calculate the offset of the light source in the image by obtaining a plurality of frame images, the processor can update the second energy spectrum data corresponding to the light source in the database to the normalized energy spectrum data which is transformed to frequency-domain and normalized according to the offset. Thereby, the identification accuracy of the light source may be further improved.

In some embodiments, the calculation of the offset may be as follows. The processor can calculate the window-size coefficient of each of the Q stripe sets in each of previous E frames of the current image according to the third energy spectrum data. The processor can calculate a window size and a variance of the stripe set by Gaussian weighting each window-size coefficient. When the window size is less than or equal to a third threshold, the processor can calculate a mean center of the stripe set. The processor can calculate an offset vector of the stripe set according to the mean center. The processor can calculate a weighting coefficient of the stripe set according to a Gaussian weighting model and the offset vector. The processor can determine the offset of the stripe set according to the weighting coefficient.

The formula of the window-size coefficient may be as shown in formula (4).

$$k_w = \frac{sqrt((\bar{u} - \text{wide})^2 + (\bar{v} - \text{height})^2)}{sqrt(\text{wide}^2 + \text{height}^2)} \qquad \text{formula (4)}$$

Wherein, $\bar{u}$ is an average of the coordinate values of the center of the stripe set on the x-axis, $\bar{v}$ is an average of the coordinate values of the center of the stripe set on the y-axis, wide is a width of the image, and height is a height of the image.

The formulas for calculating the window size and the variance may be as shown in formula (5) and formula (6), respectively.

$$\text{Window} = k_w * k\text{deltawind} + k\text{window} \qquad \text{formula (5)}$$

$$\text{Gauss\_delta} = k_w * k\text{delta} + k\text{guass\_delta} \qquad \text{formula (6)}$$

Wherein, kdeltawind, kwindow, kdelta and kguass_delta are constants of Gaussian weighting. When Window>kwieght_wind, the third threshold kwieght_wind is a constant of Gaussian weighting, and the calculation ends. That is, when the window size Window is less than or equal to the third threshold, the next block is entered.

In some embodiments, the processor can store the previous E frames in a buffer. When the previous frame in the buffer is empty, the calculation ends, otherwise the processor can calculate the mean center $(\bar{u}_0, \bar{v}_0)$ of all the centers of the stripe set in the previous E frames in the buffer. The formula for calculating the offset is shown as in formula (7).

$$(u_v, v_v) = (\bar{u}, \bar{v}) - (\bar{u}_0, \bar{v}_0) \qquad \text{formula (7)}$$

The processor can calculate the weighting coefficient weightscale as shown in formula (8).

$$\text{weightscale} = \frac{1}{2\Pi \text{gauss\_delta}(0) * \text{gauss\_delta}(1)} * \qquad \text{formula (8)}$$
$$\exp\left(-\frac{1}{2}\left(\frac{u_v^2}{\text{gauss\_delta}(0)^2} + \frac{v_v^2}{\text{gauss\_delta}(1)^2}\right)\right)$$

The updated feature description $(\bar{u}_0, \bar{v}_0)$ may be as shown in formula (9).

$$(\bar{u}_0, \bar{v}_0) = (\bar{u}_0, \bar{v}_0) + \text{weightscale}(u_v, v_v) \qquad \text{formula (9)}$$

In the embodiments, if the first energy spectrum data corresponding to a light source does not match the second energy spectrum data of the light source in the database, a new second energy spectrum data may be inserted into the database.

Figure 5:
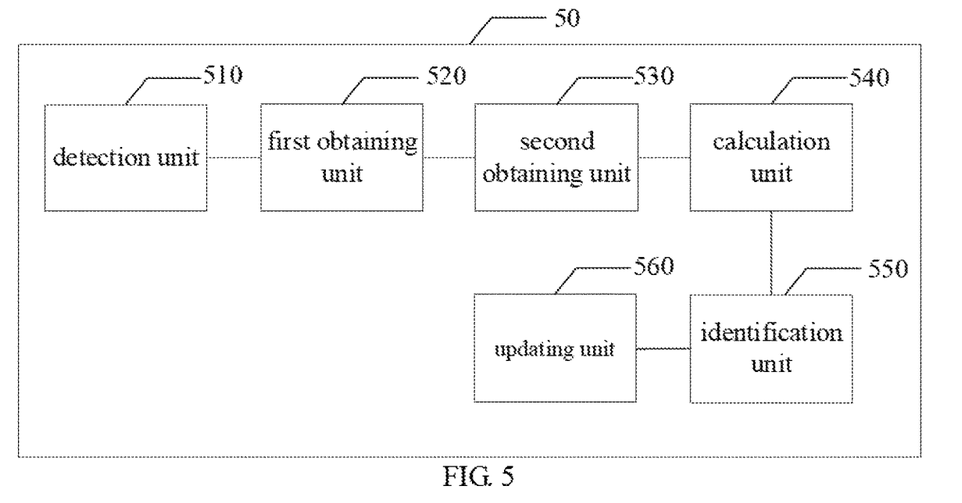
FIG. 5 illustrates a schematic view of a device for identifying light source according to embodiments of the present disclosure.

FIG. 5 illustrates a schematic view of a device for identifying light source according to embodiments of the present disclosure. The device 50 may include a detection unit 510, a first obtaining unit 520, a second obtaining unit 530, a calculation unit 540, and an identification unit 550.

In some embodiments, the detection unit 510 may be configured to detect M stripe sets in an image. Wherein the image may be obtained by capturing an image of an environmental background through a rolling shutter image sensor. The environmental background may include at least M light sources, and the light source may be movable. Wherein M is a positive integer.

The first obtaining unit 520 may be configured to obtain a first energy spectrum data corresponding to each of the M stripe sets.

The second obtaining unit 530 may be configured to obtain a second energy spectrum data corresponding to each light source in a database. Wherein the database includes K light sources, and each second energy spectrum data corresponds the identity of a light source.

The calculation unit 540 may be configured to calculate a correlation coefficient between the second energy spectrum data corresponding to each of K light sources and the first energy spectrum data corresponding to each of M stripe sets, to obtain M*K correlation coefficients.

In some embodiments, the correlation coefficient between each second energy spectrum data and each first energy spectrum data may be a Pearson correlation coefficient. And the Pearson correlation coefficient can be calculated according to a formula:

$$\left\{ \rho_{xy} = \frac{N\sum XY - \sum X \sum Y}{\sqrt{N\sum X^2 - (\sum X)^2} * \sqrt{N\sum Y^2 - (\sum Y)^2}} \right\}$$

wherein, X is the second energy spectrum data corresponding to a light source in the database, Y is the first energy spectrum data corresponding to a stripe set in the M stripe sets, and N is the dimension of an energy spectrum data.

The identification unit 550 may be configured to determine an identity of the light source corresponding to each of the M stripe sets according to M*K correlation coefficients.

Figure 5A:
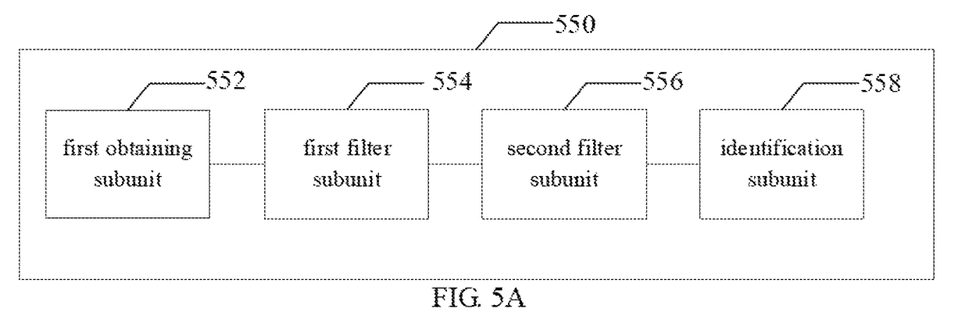
FIG. 5A illustrates a schematic view of an identification unit according to embodiments of the present disclosure.

In some embodiments, as illustrated in FIG. 5A, the identification unit 550 may include a first obtaining subunit 552, a first filter subunit 554, a second filter subunit 556, and an identification subunit 558.

The first obtaining subunit 552 may be configured to select a maximum correlation coefficient from the correlation coefficients between the second energy spectrum data and the first energy spectrum data of M stripe sets, to obtain K maximum correlation coefficients corresponding to K light sources.

The first filter subunit 554 may be configured to select the maximum correlation coefficients greater than a first threshold from the K maximum correlation coefficients to obtain L maximum correlation coefficients, wherein L is an integer less than or equal to K.

The second filter subunit 556 may be configured to perform deduplication on the L maximum correlation coefficients to obtain P maximum correlation coefficients, wherein P is an integer less than or equal to L and M respectively.

The identification subunit 558 may be configured to determine identity of the stripe set corresponding to the light source with the identity information in the database according to the P maximum correlation coefficient, to obtain the identity of the light source corresponding to stripe set in the M stripe sets.

In some embodiments, the device 50 may further include an updating unit 560. The updating unit 560 is configured to update the second energy spectrum data of the light source in the database corresponding to the stripe set in the database according to the M*K correlation coefficients.

Figure 5B:
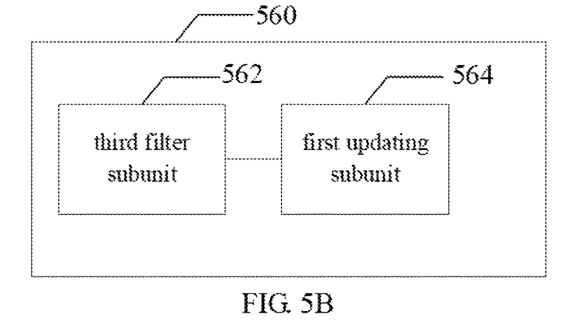
FIG. 5B illustrates a schematic view of an updating unit according to embodiments of the present disclosure.

In some embodiments, as illustrated in FIG. 5B, the updating unit 560 may include a third filter subunit 562 and a first updating subunit 564. The third filter subunit 562 may be configured to selecting the maximum correlation coefficients greater than a second threshold corresponding to the determined stripe sets, to obtain Q maximum correlation coefficients. Wherein Q is a positive integer less than or equal to P. The first updating subunit 564 may configured to update the second energy spectrum data of the light sources corresponding to the Q maximum correlation coefficients in the database.

Figure 5C:
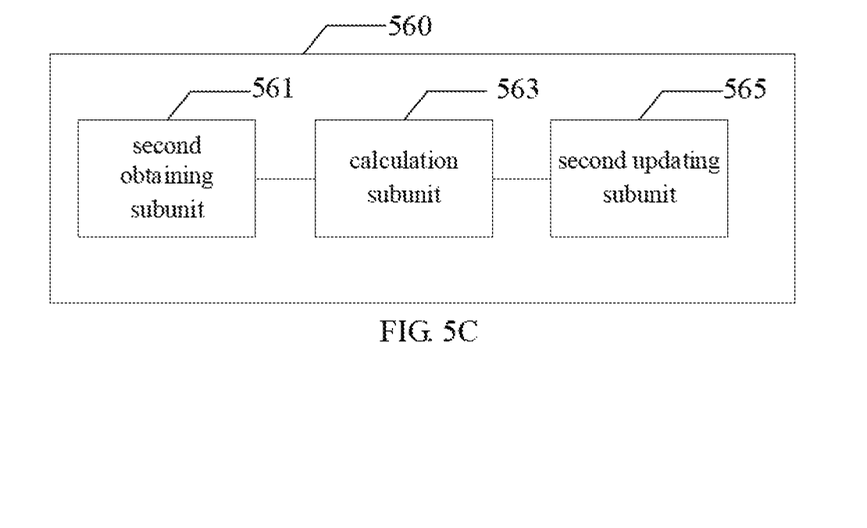
FIG. 5C illustrates a schematic view of the other updating unit according to embodiments of the present disclosure.

In some embodiments, as illustrated in FIG. 5C, the updating unit 560 may include a second obtaining subunit 561, a calculation subunit 563 and a second updating subunit 565. Wherein the second obtaining subunit 561 may be configured to obtain a third energy spectrum data corresponding to each of Q stripe sets in each of previous E frames of the image. The calculation subunit 563 may be configured to calculate an offset of each of the Q stripe sets according to the third energy spectrum data to obtain Q offsets. The second updating subunit 565 may be configured to update the second energy spectrum data corresponding to Q light sources in the database according to the Q offsets. Wherein the Q light sources correspond to the Q maximum correlation coefficients respectively.

In some embodiments, the calculation subunit may be configured to calculate a window-size coefficient of each of in the Q stripe sets in each of the previous E frames of the image, according to the third energy spectrum data, calculate a window size and a variance of the stripe set by Gaussian weighting each window-size coefficient, calculate a mean center of the stripe set, calculate an offset vector of the stripe set according to the mean center, calculate a weighting coefficient of the stripe set according to a Gaussian weighting model and the offset vector, and determine the offset of the stripe set according to the weighting coefficient.

It is understandable that the functions of each functional unit of the device 50 in the embodiments can be realized according to the method as illustrated in FIG. 1, which will not be described here.

The embodiments of the present disclosure detect M stripe sets in an image captured from an environmental background, and obtain a first energy spectrum data corresponding to each of the M stripe sets and a second energy spectrum data corresponding to each light source in a database. The database includes K light sources, each second energy spectrum data corresponds to one light source's identity information, and different light sources have different frequency domain data. So, by calculating the correlation coefficient between each second energy spectrum data and each first energy spectrum data, the identity of the light source corresponding to each of the M stripe sets may be determined. So that, the tracking of the light source emitted by a controller can be achieved.

Figure 6:
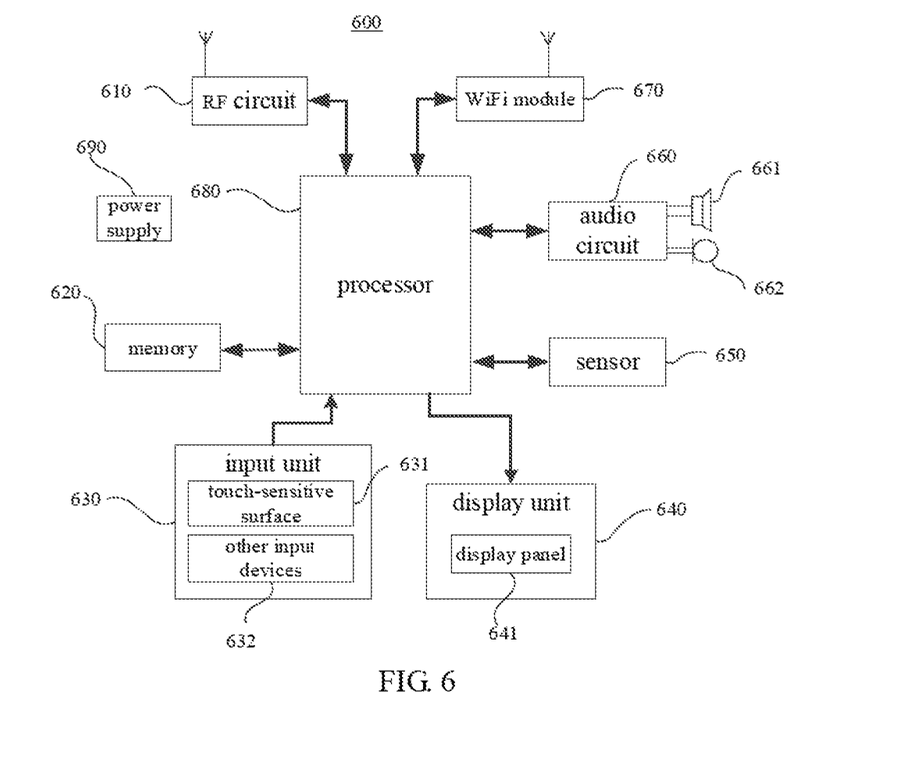
FIG. 6 illustrates a schematic view of a device according to embodiments of the present disclosure.

As illustrated in FIG. 6, the present disclosure further provides a device. Specifically, the device 600 may include an RF (radio frequency) circuit 610, a memory 620 having one or more a computer readable medium, an input unit 630, a display unit 640, a sensor 650, an audio circuit 660, a Wi-Fi (wireless fidelity) module 670, a processor 680 having one or more processing cores, and a power supply 690 and the like. It will be understood by those skilled in the art that the device structure shown in FIG. 6 does not constitute a limitation on the device and may include more or fewer components than illustrated, or to combine certain components, or different component arrangements.

Wherein, The RF circuit 610 may be used to receive and transmit information, or to receive and transmit signals during a call. The downlink information of the base station is received and processed by one or more processors 680, and the uplink data is transmitted to the base station. Typically, the RF circuit 610 may include, but is not limited to, an antenna, at least one amplifier, a tuner, one or more oscillators, a subscriber identity module (SIM) card, a transceiver, a coupler, an LNA (Low Noise Amplifier), a duplexer, etc. In addition, the RF circuit 610 may also communicate with the network and other devices by wireless communication. The wireless communication may use any communication standard or protocol including, but not limited to, GSM (Global System of Mobile communication), GPRS (General Packet Radio Service), CDMA (Code Division Multiple Access), WCDMA (Wideband Code Division Multiple Access) LTE (Long Term Evolution), e-mail, SMS (Short Messaging Service), and the like.

The memory 620 may be used to store software programs and modules. The processor 680 executes various functional applications and data processing by running software programs and modules stored in the memory 620. The memory 620 may mainly include a storage program area and a storage data area. Wherein the storage program area may store an operating system, at least one application program required for the function (such as voice playback, image playback and so on), and the like; the storage data area may store data (such as audio data, telephone book, etc.) created according to the use of the device 600, and the like. In addition, the memory 620 may include high-speed random access memory, and also may include non-volatile memory, such as at least one disk storage device, flash memory device, or other volatile solid state memory device. Accordingly, the memory 620 may also include a memory controller to provide access to the memory 620 by the processor 680 and the input unit 630.

The input unit 630 may be used to receive input digital or character information and to generate a signal input of keyboard, mouse, joystick, optical or trackball related to user settings and function control. The input unit 630 may include a touch-sensitive surface 631 and other input devices 632. The touch-sensitive surface 631, also referred to as a touch screen or a touchpad, can collect a touch operation on or near the user (such as a user operation on the touch-sensitive surface 631 or near the touch-sensitive surface 631 using a finger or stylus or any suitable object or attachment) and drives the corresponding connection device according to a preset program. Alternatively, the touch-sensitive surface 631 may include both a touch detection device and a touch controller. Wherein the touch detection device detects a touching position of the user and detects a signal from the touch operation to transmit a signal to the touch controller. The touch controller receives the touch information from the touch detection device and converts it into contact coordinates and sends it to the processor 680 and can receive the command sent by the processor 680 and execute it. In addition, the touch-sensitive surface 631 can be realized by various types such as resistive, capacitive, infrared, and surface acoustic waves. In addition to the touch-sensitive surface 631, the input unit 630 may also include other input devices 632. Other input devices 632 may include, but are not limited to, one or more of physical keyboards, function keys (such as volume control keys, switch keys, etc.), trackballs, mice, joysticks, and the like.

The display unit 640 may be used to display information entered by the user or information provided to the user and various graphical user interfaces of the device 600, which may be constructed from graphics, text, icons, video, and any combination thereof. The display unit 640 may include a display panel 641, and the display panel 641 may be configured in the form of LCD (Liquid Crystal Display), OLED (Organic Light-Emitting Diode), or the like. Further, the touch-sensitive surface 631 may cover the display panel 641. If the touch-sensitive surface 631 detects a touch operation on or near it, the touch-sensitive surface 631 sent the result to the processor 680 to determine the type of touch event. The processor 680 then provides a corresponding visual output on the display panel 641 according to the type of touch event. Although the touch-sensitive surface 631 and the display panel 641 are as two separate components in FIG. 9 to realize the input and input functions, but in some embodiments the touch-sensitive surface 631 may be integrated with the display panel 641 to achieve input and output function.

The device 600 may also include at least one sensor 660, such as a light sensor, a motion sensor, and other sensors. In particular, the light sensor may include an ambient light sensor and a proximity sensor, wherein the ambient light sensor may adjust the brightness of the display panel 641 in accordance with the shading of the ambient light, and the proximity sensor may turn off the display panel 641 and/or make the display panel 641 backlight when the device 600 is moved to the ear. As a kind of motion sensor, the gravitational acceleration sensor can detect the magnitude of the acceleration in all directions (usually three axes). When the gravity acceleration sensor is stationary, it can detect the size and direction of gravity, can be used to the application to identify the gesture of mobile phone gesture (such as vertical and horizontal screen switching, related games, magnetometer gesture calibration), vibration recognition related functions (such as pedometer, percussion) and so on. As for the device 600 can also be configured gyroscopes, barometers, hygrometers, thermometers, infrared sensors and other sensors, will not repeat them here.

An audio circuit 660, a speaker 661, and a microphone 662 may provide an audio interface between the user and the device 600. The audio circuit 660 may transmit the received electrical data converted by the received audio data to the speaker 661, and the speaker 661 converts the electrical signal into an audio signal output. On the other hand, the microphone 662 converts the captured sound signal into an electrical signal, the audio circuit 660 receives the electrical signal and converts it into audio data, outputs the audio data to the processor 680, the processor processes the audio data, the RF circuit 610 sends the processed audio data to, for example, another device, or outputs the audio data to the memory 620 for further processing. The audio circuit 660 may also include an ear plug jack to provide communication between the peripheral headset and the device 600.

Wi-Fi is a short distance wireless transmission technology. Device 600 through the Wi-Fi module 670 can help users send and receive e-mail, browse the web and access streaming media. Wi-Fi provides users with wireless broadband Internet access. Although FIG. 6 shows the Wi-Fi module 670, the Wi-Fi module 670 does not belong to the necessary configuration of the device 600 and can be omitted as needed without departing from the spirit of the present disclosure.

The processor 680 is a control center of the device 600, and various parts of the entire phone are connected by various interfaces and lines. The processor 680 performs various functions and processing data of the device 600 by running or executing software programs and/or modules stored in the memory 620, and invoking the data stored in the memory 620, to monitor the phone overall. In some embodiments, the processor 680 may include one or more processing cores. Preferably, the processor 680 may integrate an application processor and a modem processor.

Among them, the application processor mainly handles the operating system, the user interface and the application program and so on. The modem processor mainly handles wireless communications. It will be appreciated that the above-described modem processor may not be integrated into the processor 680.

The device 600 also includes a power supply 690 (e.g., a battery) that supplies power to the various components. Preferably, the power supply may be logically connected to the processor 680 through a power management system to enable functions such as managing charging, discharging, and power management through the power management system. The power supply 690 may also include any one or more components such as DC or AC power, a recharging system, a power failure detection circuit, a power converter or an inverter, a power status indicator, and the like.

Although not shown, the device 600 may include a camera, a Bluetooth module and so on, and will not be described again. Specifically, in the embodiment, the display unit of the device is a touch screen display. The device also includes a memory, and one or more programs. Wherein one or more of the programs are stored in memory and configured to be executed by one or more processors. The one or more programs contain instructions for performing the following operations.

The processor can detect M stripe sets in an image. Wherein the image may be obtained by capturing an image of the environmental background through a rolling shutter image sensor. The environmental background may include M movable light sources, wherein M is a positive integer. The processor can obtain a first energy spectrum data corresponding to each of the M stripe sets. The processor can obtain a second energy spectrum data corresponding to each light source in a database. Wherein the database may include K light sources, and each second energy spectrum data corresponds an identity of a light source. The processor can calculate a correlation coefficient between the second energy spectrum data corresponding to each of K light sources and the first energy spectrum data corresponding to each of M stripe set, to obtain M*K correlation coefficients. The processor can determine an identity of the light source corresponding to each of the M stripe sets may be determined according to M*K correlation coefficients.

In some embodiments, determining an identity of the light source corresponding to each of the M stripe sets may be as follows. The processor can select the maximum correlation coefficient from the correlation coefficients between the second energy spectrum data of each light source and the first energy spectrum data of M stripe sets, to obtain K maximum correlation coefficients corresponding to K light sources. The processor can select the maximum correlation coefficients greater than a first threshold from the K maximum correlation coefficients, to obtain L maximum correlation coefficients. Wherein L is an integer less than or equal to K. The processor can perform deduplication on the L maximum correlation coefficients, to obtain P maximum correlation coefficients, wherein P is an integer less than or equal to L and M respectively. The processor can determine the identity of the stripe set corresponding to the light source with the identity information in the database, according to the P maximum correlation coefficients.

In some embodiments, the processor can update the second energy spectrum data of the light source in the database corresponding to the stripe set according to the M*K correlation coefficients.

In some embodiments, updating the second energy spectrum data may include as follows.

The processor can select the maximum correlation coefficients greater than a second threshold corresponding to the determined stripe sets, to obtain Q maximum correlation coefficients. Wherein Q is a positive integer less than or equal to P. The processor can update the second energy spectrum data of the light source corresponding to the Q maximum correlation coefficients in the database.

In some embodiments, the second energy spectrum data may be updated as follows. The processor can obtain a third energy spectrum data corresponding to each of the Q stripe sets in each of the previous E frames of the image. The processor can calculate an offset of each of the Q stripe sets according to the third energy spectrum data to obtain Q offsets. The processor can update the second energy spectrum data corresponding to the Q light sources in the database according to the Q offsets. Wherein the Q light sources correspond to the Q maximum correlation coefficients respectively.

In some embodiments, the calculation of the offset may be as follows. The processor can calculate a window-size coefficient of each of the Q stripe sets in each of the previous E frames of the image according to the third energy spectrum data. The processor can calculate a window size and a variance of the stripe set by Gaussian weighting each window-size coefficient. When the window size is less than or equal to a third threshold, the processor can calculate a mean center of the stripe set. The processor can calculate an offset vector of the stripe set according to the mean center. The processor can calculate a weighting coefficient of the stripe set according to a Gaussian weighting model and the offset vector. The processor can determine the offset of the stripe set according to the weighting coefficient.

In some embodiments, the correlation coefficient between each second energy spectrum data and each first energy spectrum data may be a Pearson correlation coefficient. And the calculation formula of Pearson correlation coefficient is as follows.

$$\left\{\rho_{xy} = \frac{N\sum XY - \sum X \sum Y}{\sqrt{N\sum X^2 - (\sum X)^2} * \sqrt{N\sum Y^2 - (\sum Y)^2}}\right\}$$

wherein, X is the second energy spectrum data corresponding to a light source in the database, Y is the first energy spectrum data corresponding to a stripe set in M stripe sets, and N is the dimension of an energy spectrum data.

In the above embodiments, it may be implemented in whole or in part by software, hardware, firmware, or any combination thereof. When implemented by a software program, it may be implemented in whole or in part in the form of a computer program product. The computer program product includes one or more computer instructions. When the computer instructions are loaded and executed on a computer, the processes or functions in accordance with embodiments of the present disclosure are generated in whole or in part. The computer may be a general purpose computer, a special purpose computer, a computer network, or other programmable device. The computer instructions may be stored in a computer readable storage medium or transferred from one computer readable storage medium to another computer readable storage medium. For example, computer instructions can be transmitted from a website site, computer, server or data center to another website, computer, server, or data center by wire (eg, Coax, fiber, digital subscriber line (DSL)) or wirelessly (eg, infrared, wireless, microwave, etc.). The computer readable storage medium may be any available media that can be accessed by a computer or a data storage device such as a server, a data center, or the like that includes one or more available media. The available media may be a magnetic media (eg, floppy disk, hard disk, magnetic tape), optical media (eg, DVD), or semiconductor media (eg, Solid State Disk (SSD)).

The above embodiments are only optional embodiment of the present disclosure, and the scope of the present disclosure is not limited thereto. Equivalent variations in the claims of the present disclosure are still within the scope of the present disclosure.

What is claimed is:

1. A method for identifying a light source, comprising:
   detecting M stripe sets in an image;
   obtaining a first energy spectrum data corresponding to each of the M stripe sets;
   obtaining a second energy spectrum data corresponding to each light source in a database, wherein the database includes K light sources, the second energy spectrum data corresponds an identity of the light source;
   calculating a correlation coefficient between the second energy spectrum data corresponding to each of the K light sources and the first energy spectrum data corresponding to each of the M stripe sets, to obtain M*K correlation coefficients; and
   determining the identity of each stripe set corresponding to the light source in the database, according to the M*K correlation coefficients, comprising:
      selecting a maximum correlation coefficient from the correlation coefficients between the second energy spectrum data of each light source and the first energy spectrum data of the M stripe sets, to obtain K maximum correlation coefficients corresponding to K light sources;
      selecting the maximum correlation coefficients greater than a first threshold from the K maximum correlation coefficients, to obtain L maximum correlation coefficients, wherein L is an integer less than or equal to K;
      performing deduplication on the L maximum correlation coefficients, to obtain P maximum correlation coefficients, wherein P is an integer less than or equal to L and M respectively; and
      determining the identity of the stripe set corresponding to the light source with the identity information in the database, according to the P maximum correlation coefficients.

2. The method of claim 1, further comprising:
   after determining the identity of the stripe set corresponding to the light source, updating the second energy spectrum data of the light source in the database corresponding to the stripe set, according to the M*K correlation coefficients.

3. The method of claim 2, wherein updating the second energy spectrum data of the light source comprises:
   selecting the maximum correlation coefficients greater than a second threshold corresponding to the determined stripe sets, to obtain Q maximum correlation coefficients, wherein Q is a positive integer less than or equal to P;
   updating the second energy spectrum data of the light sources corresponding to the Q maximum correlation coefficients in the database.

4. The method of claim 3, wherein updating the second energy spectrum data comprises: obtaining a third energy spectrum data corresponding to each of Q stripe sets in each of previous E frames of the image;
   calculating an offset of each of the Q stripe sets according to the third energy spectrum data, to obtain Q offsets;
   updating the second energy spectrum data corresponding to Q light sources in the database according to the Q offsets, wherein the Q light sources correspond to the Q maximum correlation coefficients respectively.

5. The method of claim 4, wherein calculating an offset of each the Q stripe set comprises:
   calculating a window-size coefficient of each of the Q stripe sets in each of the previous E frames of the image, according to the third energy spectrum data;
   calculating a window size and a variance of the stripe set by Gaussian weighting each window-size coefficient;
   calculating a mean center of the stripe set, when the window size is less than or equal to a third threshold;
   calculating an offset vector of the stripe set according to the mean center;
   calculating a weighting coefficient of the stripe set according to a Gaussian weighting model and the offset vector;
   determining the offset of the stripe set according to the weighting coefficient.

6. The method of claim 5, wherein the correlation coefficient between the second energy spectrum data and the first energy spectrum data is a Pearson correlation coefficient, the Pearson correlation coefficient is calculated according to a formula:

$$\left\{ \rho_{xy} = \frac{N \sum XY - \sum X \sum Y}{\sqrt{N \sum X^2 - (\sum X)^2} * \sqrt{N \sum Y^2 - (\sum Y)^2}} \right\}$$

wherein, X is the second energy spectrum data corresponding to a light source in the database, Y is the first energy spectrum data corresponding to one of the M stripe sets, and N is the dimension of an energy spectrum data.

7. The method of claim 1, wherein obtaining a first energy spectrum data comprises:
   obtaining each stripe set in the image;
   sampling along a first direction to obtain n sampling points, wherein n is a positive integer, the center of each stripe set is taken as a reference point;
   extending the n sampling points periodically to obtain N calculation points, wherein N is a positive integer greater than n;
   transforming the N calculation points to frequency domain to obtain frequency domain data; and
   normalizing energy spectrum data of the frequency domain data to obtain the first energy spectrum data.

8. The method of claim 1, wherein frequency domain characteristics of each light source is stored in the database, the method comprises:
   calculating frequency domain data according to the frequency domain characteristics; and
   normalizing energy spectrum data in the frequency domain data to obtain the second energy spectrum data.

9. An electronic device, comprising:
   one or more processors; and
   a memory storing one or more programs configured to be executed by the one or more processors, the one or more programs comprising instructions for:

detecting M stripe sets in an image;
obtaining a first energy spectrum data corresponding to each of the M stripe sets;
obtaining a second energy spectrum data corresponding to each light source in a database, wherein the database comprising K light sources, the second energy spectrum data corresponding to an identity of the light source;
calculating a correlation coefficient between the second energy spectrum data of each of the K light sources and the first energy spectrum data corresponding to each of the M stripe sets, to obtain M*K correlation coefficients; and
determining the identity of each stripe set corresponding to the light source in the database, according to the M*K correlation coefficients, comprising:
 selecting a maximum correlation coefficient from the correlation coefficients between the second energy spectrum data of each light source and the first energy spectrum data of the M stripe sets, to obtain K maximum correlation coefficients corresponding to the K light sources;
 selecting the maximum correlation coefficients greater than a first threshold from the K maximum correlation coefficients, to obtain L maximum correlation coefficients, wherein L is an integer less than or equal to K;
 performing deduplication on the L maximum correlation coefficients, to obtain P maximum correlation coefficients, wherein P is an integer less than or equal to L and M respectively; and
 determining the identity of the stripe set corresponding to the light source with the identity information in the database, according to the P maximum correlation coefficients.

10. The electronic device of claim 9, the one or more programs comprising instructions further for:
after determining the identity of the stripe set corresponding to the light source, updating the second energy spectrum data of the light source in the database corresponding to the stripe set, according to the M*K correlation coefficients.

11. The electronic device of claim 10, wherein updating the second energy spectrum data of the light source comprises:
selecting the maximum correlation coefficients greater than a second threshold corresponding to the determined stripe sets, to obtain Q maximum correlation coefficients, wherein Q is a positive integer less than or equal to P;
updating the second energy spectrum data of the light sources corresponding to the Q maximum correlation coefficients in the database.

12. The electronic device of claim 11, wherein updating the second energy spectrum data comprises:
obtaining a third energy spectrum data corresponding to each of Q stripe sets in each of previous E frames of the image;
calculating an offset of each Q stripe set according to the third energy spectrum data, to obtain Q offsets;
updating the second energy spectrum data corresponding to Q light sources in the database according to the Q offsets, wherein the Q light sources correspond to the Q maximum correlation coefficients respectively.

13. The electronic device of claim 12, wherein calculating an offset of each the Q stripe set comprises:

calculating a window-size coefficient of each of the Q stripe sets in each of the previous E frames of the image, according to the third energy spectrum data;
calculating a window size and a variance of the stripe set by Gaussian weighting each window-size coefficient;
calculating a mean center of the stripe set, when the window size is less than or equal to a third threshold;
calculating an offset vector of the stripe set according to the mean center;
calculating a weighting coefficient of the stripe set according to a Gaussian weighting model and the offset vector;
determining the offset of the stripe set according to the weighting coefficient.

14. A non-transitory computer readable medium, storing on or more programs configured to be executed by one or more processors of an electronic device, the one or more programs comprising instruction for:
detecting M stripe sets in an image;
obtaining a first energy spectrum data corresponding to each of the M stripe sets;
obtaining a second energy spectrum data corresponding to each light source in a database, the database comprising K light sources, the second energy spectrum data corresponding to an identity of each light source;
calculating a correlation coefficient between the second energy spectrum data of each of the K light sources and the first energy spectrum data corresponding to each of the M stripe sets, to obtain M*K correlation coefficients; and
determining the identity of each stripe set corresponding to the light source in the database, according to the M*K correlation coefficients, comprising:
 selecting a maximum correlation coefficient from the correlation coefficients between the second energy spectrum data of each light source and the first energy spectrum data of the M stripe sets, to obtain K maximum correlation coefficients corresponding to the K light sources;
 selecting the maximum correlation coefficients greater than a first threshold from the K maximum correlation coefficients, to obtain L maximum correlation coefficients, wherein L is an integer less than or equal to K;
 performing deduplication on the L maximum correlation coefficients, to obtain P maximum correlation coefficients, wherein P is an integer less than or equal to L and M respectively; and
 determining the identity of the stripe set corresponding to the light source with the identity information in the database, according to the P maximum correlation coefficients.

15. The non-transitory computer readable medium of claim 14, the one or more programs comprising instructions further for:
after determining the identity of the stripe set corresponding to the light source, updating the second energy spectrum data of the light source in the database corresponding to the stripe set, according to the M*K correlation coefficients.

16. The non-transitory computer readable medium of claim 15, wherein updating the second energy spectrum data of the light source comprises:
selecting the maximum correlation coefficients greater than a second threshold corresponding to the determined stripe sets, to obtain Q maximum correlation coefficients, wherein Q is a positive integer less than or equal to P;

updating the second energy spectrum data of the light sources corresponding to the Q maximum correlation coefficients in the database.

17. The non-transitory computer readable medium of claim 16, wherein updating the second energy spectrum data comprises:

obtaining a third energy spectrum data corresponding to each of Q stripe sets in each of previous E frames of the image;

calculating an offset of each Q stripe set according to the third energy spectrum data, to obtain Q offsets;

updating the second energy spectrum data corresponding to Q light sources in the database according to the Q offsets, wherein the Q light sources correspond to the Q maximum correlation coefficients respectively.

18. The method of claim 1, wherein the correlation coefficient between the second energy spectrum data and the first energy spectrum data is a Pearson correlation coefficient, the Pearson correlation coefficient is calculated according to a formula:

$$\left\{\rho_{xy} = \frac{N\sum XY - \sum X \sum Y}{\sqrt{N\sum X^2 - (\sum X)^2} * \sqrt{N\sum Y^2 - (\sum Y)^2}}\right\}$$

wherein, X is the second energy spectrum data corresponding to a light source in the database, Y is the first energy spectrum data corresponding to one of the M stripe sets, and N is the dimension of an energy spectrum data.

19. The method of claim 7, wherein N is equal to n times (k−1) plus m, m is less than or equal to n, and $$m = N - \text{int}\left(\frac{N}{n}\right) * n.$$

20. The method of claim 7, wherein the n sampling points are represented as $(d_1, d_2, \ldots, d_n)$, the n sampling points $(d_1, d_2, \ldots, d_n)$ are obtained by $$\left\{d_1 = \left(u_0 - \frac{n}{2}, v_0\right), d_2 = \left(u_0 - \frac{n-1}{2}, v_0\right), \ldots, d_n = \left(u_0 + \frac{n-1}{2}, v_0\right)\right\}$$

when the first direction is perpendicular to a width direction of the image, the width direction of the image is the y-axis direction, $u_0$ is the coordinate value of the center of the stripe set on the x-axis, and $v_0$ is the coordinate value of the center of the stripe set on the y-axis.

\* \* \* \* \*